United States Patent
Okuda

(10) Patent No.: US 9,832,609 B2
(45) Date of Patent: Nov. 28, 2017

(54) SENSOR REMOTE CONTROL SYSTEM, REMOTE CONTROL DEVICE, SENSOR DEVICE AND METHOD OF REMOTELY CONTROLLING SENSOR

(71) Applicant: FURUNO ELECTRIC CO., LTD., Nishinomiya, Hyogo (JP)

(72) Inventor: Masato Okuda, Nishinomiya (JP)

(73) Assignee: FURUNO ELECTRIC COMPANY LIMITED, Anan-Shi, Tokushima (JP)

(*) Notice: Subject to any disclaimer, the term of this patent is extended or adjusted under 35 U.S.C. 154(b) by 120 days.

(21) Appl. No.: 14/919,107

(22) Filed: Oct. 21, 2015

(65) Prior Publication Data

US 2016/0127868 A1 May 5, 2016

(30) Foreign Application Priority Data

Oct. 31, 2014 (JP) ................................ 2014-223783

(51) Int. Cl.
*H04W 4/00* (2009.01)
*H04W 4/02* (2009.01)

(52) U.S. Cl.
CPC ........... *H04W 4/023* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 2006/0206244 A1* | 9/2006 | Arvidsson | G05D 1/0033 701/2 |
| 2015/0100323 A1* | 4/2015 | Kozuka | G06F 3/017 704/275 |
| 2016/0039436 A1* | 2/2016 | Bhagwatkar | A63H 19/24 348/148 |

FOREIGN PATENT DOCUMENTS

| | | |
|---|---|---|
| JP | 2012-112674 A | 6/2012 |
| JP | 2013-079813 A | 5/2013 |

* cited by examiner

*Primary Examiner* — Minh-Trang Nguyen
(74) *Attorney, Agent, or Firm* — Studebaker & Brackett PC

(57) ABSTRACT

A sensor remote control system is provided. The sensor remote control system includes a sensor device configured to transmit and receive a detection signal in a direction to detect information in the direction, and a remote control device configured to transmit, to the sensor device, a control signal to remotely control the sensor device. The remote control device includes an orientation sensor configured to detect an oriented direction of the remote control device, and a communicator configured to generate the control signal based on the oriented direction detected by the orientation sensor, and transmit the control signal to the sensor device. The sensor device performs the detection based on the control signal received from the remote control device.

20 Claims, 6 Drawing Sheets

SENSOR REMOTE CONTROL SYSTEM, REMOTE CONTROL DEVICE, SENSOR DEVICE AND METHOD OF REMOTELY CONTROLLING SENSOR

CROSS-REFERENCE TO RELATED APPLICATION(S)

This application claims priority under 35 U.S.C. §119 to Japanese Patent Application No. 2014-223783, which was filed on Oct. 31, 2014, the entire disclosure of which is hereby incorporated by reference.

TECHNICAL FIELD

This disclosure generally relates to a sensor remote control system, which remotely controls a sensor that detects vicinity information.

BACKGROUND OF THE INVENTION

Conventionally, display devices which acquire information from a plurality of ship instruments and display the information are known. JP2013-079813A discloses a display device of such a kind.

The display device of JP2013-079813A (a touch panel device) receives detection results from a fish finder and a radar antenna and displays the detection results (e.g., radar image). A user can grasp a situation in the vicinity of a ship concerned by referring to the display device.

Further, JP2012-112674A discloses an art of increasing the number of times that a radio wave is transmitted within a predetermined angular range. The angular range is specified by using a user-interface while checking a display unit of a radar apparatus. Thus, the resolution can suitably be increased while preventing an increase in data amount.

Incidentally, the display device such as the one in JP2013-079813A is fixed to a position in a location where the ship is steered (e.g., the bridge, the command room of the ship). Therefore, the user needs to stay in front of the display device to perform an instruction to the radar apparatus, etc. Since the user may take a break, go fishing, etc., at a different location, he/she needs to move to the front of the display device to perform an instruction to the radar apparatus every time. Therefore, it is troublesome for the user and difficult to perform an instruction smoothly.

Moreover, the user generally confirms the situation in the vicinity of the ship concerned visually in addition to the radar image displayed on the display device. Therefore, in a case of increasing the number of times of the radio wave transmissions only for the predetermined angular range based on information confirmed visually, the user needs to grasp the correspondence between an actual azimuth and an azimuth on the display device, and thus, it is difficult to smoothly specify the predetermined angular range.

Furthermore, also in a case where a single detection only covers a predetermined range and the entire vicinity is detected by rotating an antenna (e.g., a case of using a search light sonar), it is difficult to specify a direction of the radar apparatus, etc., (sensor) based on the information visually confirmed.

SUMMARY OF THE INVENTION

The purpose of this disclosure relates to providing a sensor remote control system, which has a configuration to instinctively specify a direction based on which a sensor device for detecting vicinity information is controlled.

According to one aspect of this disclosure, a sensor remote control system is provided. The sensor remote control system includes a sensor device configured to transmit and receive a detection signal in a direction to detect information in the direction, and a remote control device configured to transmit, to the sensor device, a control signal to remotely control the sensor device. The remote control device includes an orientation sensor configured to detect an oriented direction of the remote control device, and a communicator configured to generate the control signal based on the oriented direction detected by the orientation sensor, and transmit the control signal to the sensor device. The sensor device performs the detection based on the control signal received from the remote control device.

Thus, by simply orienting the remote control device to a desired direction, the direction can be transmitted to the sensor device. Therefore, the direction can instinctively be specified based on information visually confirmed. Further, by using the remote control device, a user can perform an instruction on the sensor device without staying in front of a display device.

The control signal preferably specifies a detecting direction of the sensor device.

Thus, the direction for which a performing state of the detection is switched between performing and not performing or contents of the detection are changed, can instinctively and easily be specified.

The control signal preferably adjusts contents of the detection to be different between the detecting direction specified by the remote control device and other direction.

Thus, an instinctive instruction can be performed in a case of detecting, with particular contents, a detection target existing only in a predetermined direction, for example.

The control signal preferably specifies a detecting range at least based on a starting point specifying operation in which a starting point of the detecting range is specified and a terminal point specifying operation in which a terminal point of the detecting range is specified.

Thus, an instinctive instruction can be performed even when switching the performing state of the detection between performing and not performing or changing contents of the detection for a wide range of directions.

The control signal preferably adjusts contents of the detection to be different between the detecting range specified by the remote control device and other range.

Thus, an instinctive instruction can be performed in a case of detecting, with particular contents, a detection target existing only in a predetermined range, for example.

The remote control device and the sensor device are preferably provided on a ship.

Since the vicinity of the ship is generally checked frequently by the sensor device and sight, the effects of the present invention can be exerted more advantageously.

The remote control device and the sensor device are preferably connected to the same local area network as each other.

Thus, compared to a configuration for a signal communication with, for example, infrared rays, the communication reliability can be improved.

The remote control device is preferably connected to a local area network wirelessly.

Thus, the direction can be specified into the sensor device from a position comparatively far from the sensor device.

According to another aspect of this disclosure, a remote control device having the following configuration is provided. Specifically, the remote control device includes an orientation sensor configured to detect an oriented direction of the remote control device, and a communicator configured to remotely control a sensor device by generating a control signal based on the oriented direction detected by the orientation sensor and transmitting the control signal to the sensor device, the sensor device transmitting and receiving a detection signal in a direction to detect information in the direction.

Thus, by simply orienting the remote control device to a desired direction, the direction can be transmitted to the sensor device. Therefore, the direction can instinctively be specified based on information visually confirmed.

According to still another aspect of this disclosure, a sensor device is provided. The sensor device is configured to receive a control signal from a remote control device, and transmit and receive a detection signal in a predetermined direction based on the received control signal to detect information in the predetermined direction, the control signal generated based on an oriented direction of the remote control device.

Thus, by simply orienting the remote control device to a desired direction, the direction can be transmitted to the sensor device. Therefore, the direction can instinctively be specified based on information visually confirmed.

According to further another aspect of this disclosure, a method of remotely controlling a sensor is provided. The method of remotely controlling the sensor includes detecting an oriented direction of a remote control device, controlling a sensor device by generating a control signal based on the detected oriented direction and transmitting the control signal from the remote control device to the sensor device, receiving the transmitted control signal with the sensor device, and controlling the sensor device based on the transmitted control signal. The sensor device transmits and receives a detection signal in a direction to detect information in the direction.

Thus, by simply orienting the remote control device to a desired direction, the direction can be transmitted to the sensor device. Therefore, the direction can instinctively be specified based on information visually confirmed.

BRIEF DESCRIPTION OF THE DRAWING(S)

The present disclosure is illustrated by way of example and not by way of limitation in the figures of the accompanying drawings, in which the like reference numerals indicate like elements and in which.

DETAILED DESCRIPTION

Next, one embodiment of this disclosure is described with reference to the appended drawings.

A ship instrument network system 1 includes a plurality of ship instruments connected to a ship network 10 of a ship (hereinafter, referred to as "the single ship" or "the own ship"). The ship network 10 is a network for ship instruments of the single ship to communicate with each other, and is not a network for different ships to communicate with each other. The ship instruments of the single ship exchange information detected thereby, etc., via the ship network 10. The ship network 10 is a LAN (Local Area Network). Specifically, any one of Ethernet (registered trademark), a CAN (Controller Area Network), and an NMEA (National Marine Electronics Association) may be adopted.

Figure 1:
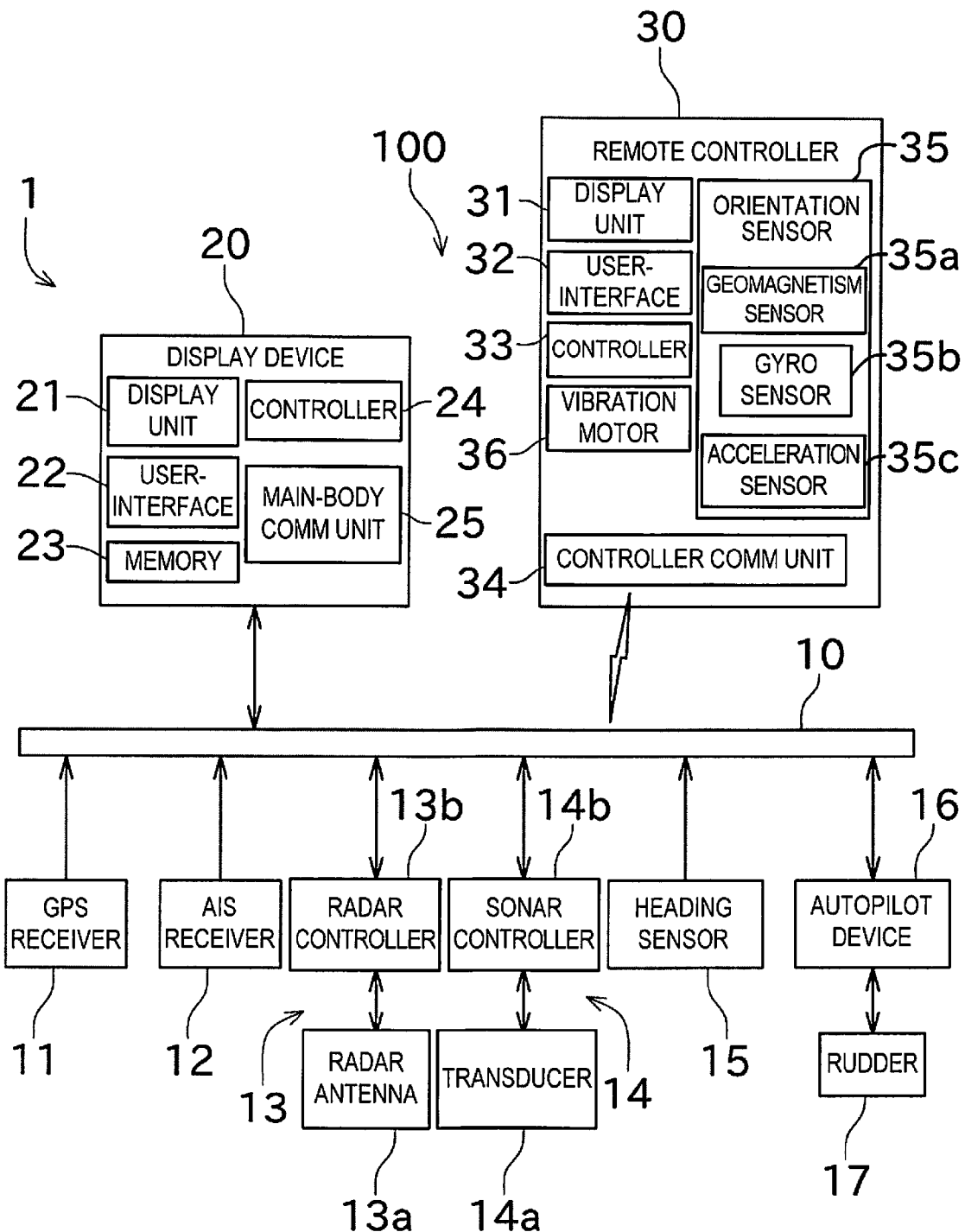
FIG. 1 is a block diagram of a ship instrument network system including a sensor remote control system.

As illustrated in FIG. 1, the ship instrument network system 1 of this embodiment includes a GPS receiver 11, an AIS receiver 12, a radar apparatus (sensor device) 13, a sonar (sensor device) 14, a heading sensor 15, an autopilot device 16, a display device 20, and a remote controller (remote control device) 30.

The GPS receiver 11 receives positioning signals from GPS satellites (GNSS satellites) via a GPS antenna (not illustrated). The GPS receiver 11 obtains a position of the own ship (specifically, a position of the GPS antenna, a terrestrial-reference absolute position of the own ship) based on the positioning signals and transmits the obtained position to the display device 20.

The AIS receiver 12 receives an AIS signal transmitted from another ship. An AIS (Universal Shipborne Automatic Identification System) is a system that is mounted on a ship concerned and transmits therearound positional information, navigational information, etc., of the ship concerned via a wireless communication. The AIS receiver 12 receives the AIS signal transmitted from the other ship and analyzes it to acquire information of the other ship, such as its absolute position and destination (AIS information). The AIS receiver 12 transmits the acquired AIS information to the display device 20. Since the AIS information includes the absolute position of the other ship, by comparing it with the absolute position of the own ship, an azimuth and a distance at which the other ship exists can be calculated. Note that, the AIS signal may be analyzed by the display device 20.

The radar apparatus 13 includes a radar antenna 13a and a radar controller 13b. The radar antenna 13a transmits an electromagnetic wave (detection signal) and receives a reflection wave caused by the electromagnetic wave reflected on a target object (the transmission and the reception are comprehensively referred to as the detection). Note that, a direction in which the detection by the radar apparatus 13 is performable is referred to as the detecting direction. The radar controller 13b performs suitable signal processing on the reflection wave and then transmits the processed reflection wave to the display device 20. The display device 20 displays a radar image based on information retrieved from the reflection wave received from the radar apparatus 13 (the image at the top right section of the display device 20 in FIG. 2).

Specifically, the radar apparatus 13 obtains a distance to the target object based on a period of time from the transmission of the electromagnetic wave until the reception of the reflection wave. Further, the radar apparatus 13 obtains the azimuth at which the target object exists, based on the direction to which the electromagnetic wave is transmitted. Note that, the radar image may be created by the display device 20 based on the reflection wave. Moreover, an echo with at least a predetermined intensity may be extracted from the reflection wave by the radar apparatus 13, a position corresponding to the echo and the intensity of the echo may be transmitted to the display device 20, and the display device 20 may display the radar image based on the detection result.

Also, the radar apparatus 13 of this embodiment may vary a property of the electromagnetic wave depending on the transmission azimuth. Specifically, the intensity (power), frequency, pulse width, etc., of the electromagnetic wave may be changed. Further, the radar apparatus 13 may also not transmit the electromagnetic wave only at a predetermined azimuth or may change a transmission interval of the electromagnetic wave at a predetermined azimuth.

The sonar 14 includes a transducer 14a and a sonar controller 14b. The transducer 14a is attached at a bottom of the own ship, transmits an ultrasonic wave (detection signal) underwater, and receives a reflection wave caused by the ultrasonic wave reflected on one of a school of fish and a waterbed (the transmission and the reception are comprehensively referred to as the detection). Note that, a direction in which the detection by the sonar 14 is performable is referred to as the detecting direction. The sonar controller 14b performs suitable signal processing on the reflection wave and then transmits the processed reflection wave to the display device 20. The display device 20 displays an underwater detection image based on information retrieved from the reflection wave received from the sonar 14 (the image at the bottom right section of the display device 20 in FIG. 2).

Specifically, the sonar 14 obtains a distance to the one of the school of fish and the waterbed and an azimuth thereof based on a period of time from the transmission of the ultrasonic wave until the reception of the reflection wave and the direction to which the ultrasonic wave is transmitted, similar to the radar apparatus 13. Further, the sonar 14 may measure a fish body length by using the known split-beam method or dual-beam method. Note that, at least part of the processing described above may be performed by the display device 20.

Moreover, the sonar 14 may be one of a search light sonar and a scanning sonar. A search light sonar performs a detection in the vicinity thereof by transmitting an ultrasonic wave that has a detectable range corresponding to a few degrees in azimuth, while changing its transmission azimuth gradually. A scanning sonar performs a detection in the vicinity thereof by simultaneously transmitting ultrasonic waves over, for example, the entire or half of entire circumference of a ship concerned. An elevation/depression angle (angle between the transmission direction and the water surface, tilt) of the sonar 14 is changeable. Further, in the case where the sonar 14 is the search light sonar, an intensity or a frequency of the ultrasonic wave to be transmitted at a predetermined azimuth may be changed, the ultrasonic wave may be transmitted only at a predetermined azimuth, etc.

The heading sensor 15 detects a heading of the own ship (direction in which a bow of the own ship is oriented) as a terrestrial-reference absolute azimuth. The heading sensor 15 is any one of a magnetic azimuth sensor, a GPS compass and a gyrocompass, for example.

The autopilot device 16 controls a rudder 17 to follow a designed course. Specifically, the autopilot device 16 calculates a variation angle, that is a difference between the heading acquired from the heading sensor 15 and the designed course, and controls the rudder 17 to change a steering angle so that the variation angle becomes close to zero. Note that, the course is designed by the autopilot device 16, the display device 20, the remote controller 30, etc.

Figure 2:
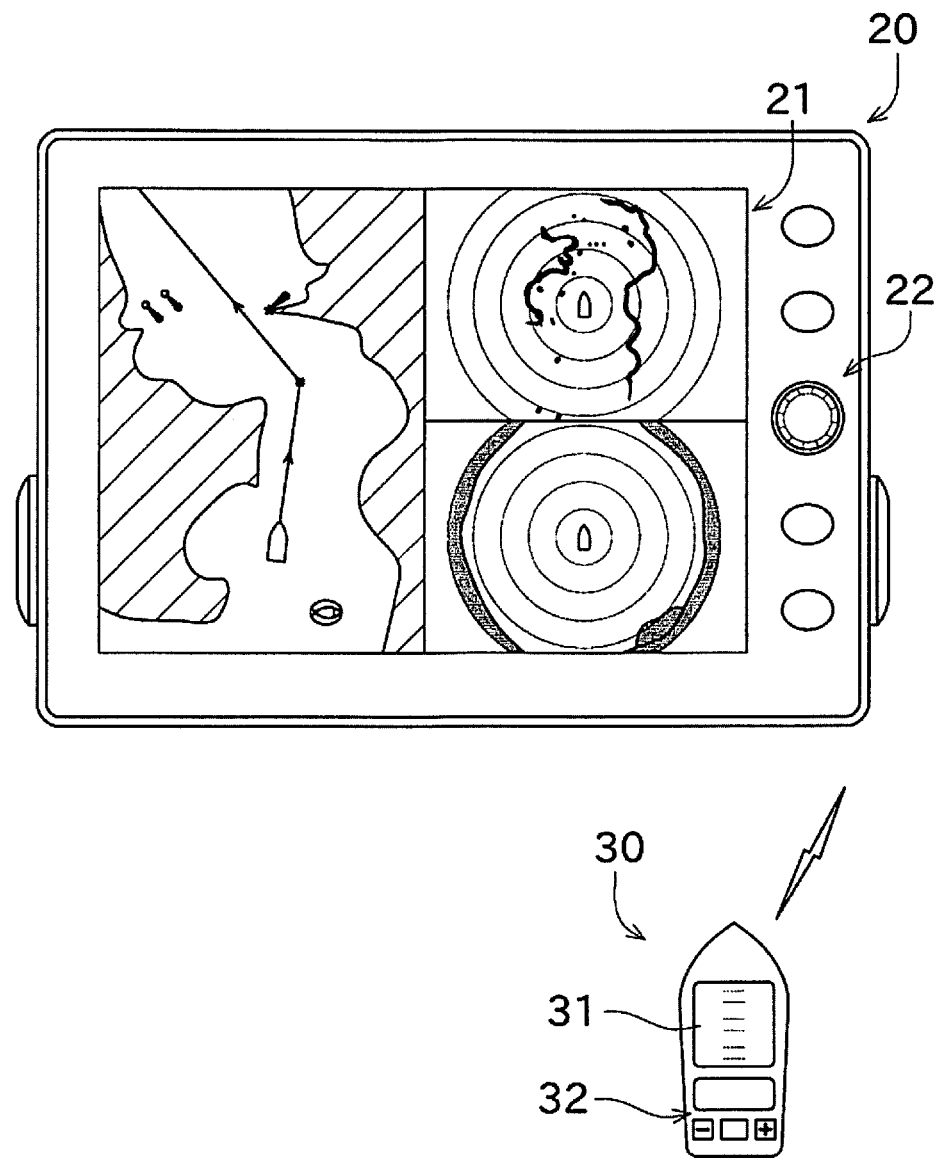
FIG. 2 is an elevational view of a display device and a remote controller.

As illustrated in FIG. 2, the display device 20 creates images (sensor images) based on the information detected by the other ship instruments (sensor devices), displays the created images, and performs processing according to operation performed by a user. Specifically, the display device 20 includes a display unit 21, a user-interface 22, a memory 23, a controller 24, and a main-body communication unit 25.

The display unit 21 is configured by, for example, a liquid crystal display. The display unit 21 displays the sensor images, a setting screen, etc.

The user-interface 22 is configured by a rotatable key in a clockwise/counterclockwise direction, a menu key configured to call for a menu screen, a cursor key, etc. Note that, in the display device 20 of this embodiment, the user-interface is provided to the display device 20 itself; however, other kinds of user-interface, such as a mouse and/or a keyboard, may be externally attachable, and the user-interface may detect touch operation by the user.

The memory 23 stores contents of a program which is executed by the controller 24, nautical chart information, a location specified by the user, etc. The nautical chart information includes information of positions of a lighthouse, a channel buoy, a port, a fish bed, a navigation prohibited area, a shallow bottom area, and a frozen area, and water depths at these positions. The location specified by the user is at least one of a destination, stopover(s) before reaching the destination (waypoint(s)), and other locations (e.g., a location at which a predetermined school of fish is detected). Since the information included in the nautical chart information and the location specified by the user are associated with absolute positions thereof, by comparing them with the absolute position of the own ship, azimuths and distances to which these information and location correspond can be calculated.

The controller 24 creates the radar image, the underwater detection image, a chart image (an image with the position of the own ship on a nautical chart, the image at the left section of the display device 20 in FIG. 2), etc., based on the stored contents in the memory 23 and the information received from the other ship instruments and displays them on the display unit 21.

The main-body communication unit 25 is an interface communicable through a LAN, and is communicable with the ship instruments connected to the ship network 10.

The remote controller 30 is connected with the ship instruments, such as the display device 20, by a wireless LAN. The remote controller 30 transmits a predetermined instruction to the display device 20 based on a pointing direction of the remote controller 30, receives information from the display device 20, and displays the information. The remote controller 30 of this embodiment is a long flat-plate member formed into a boat shape, and has a size which allows the user to control with one hand. Hereinafter, one side of the remote controller 30 seen in its thickness direction is a front face of the remote controller 30, a bow-side end of the boat shape (one end in its longitudinal direction) is a tip of the remote controller 30, and an opposite side end of the boat shape (an end on the side gripped by the user) is a base end.

As illustrated in FIGS. 1 and 2, the remote controller 30 includes a display unit 31, a user-interface 32, a controller 33, a controller communication unit (communicator) 34, an orientation sensor 35, and a vibration motor 36.

The display unit 31 is configured by, for example, a liquid crystal display disposed at the front face of the remote controller 30. The display unit 31 displays the pointing direction of the remote controller 30, the information received from the display device 20, setting information, etc.

The user-interface 32 includes a plurality of keys. The user performs predetermined operation on the user-interface 32 to display the menu screen, select a predetermined menu item, and specify the selection.

The controller 33 controls respective parts of the remote controller 30. Specifically, the controller 33, in response to the operation by the user, generates a signal to be transmitted to the display device 20, converts a signal received from the display device 20 to display it on the display unit 31.

The controller communication unit 34 is configured by, for example, an antenna communicable by a wireless LAN. The controller communication unit 34 is communicable with the display device 20 disposed outside the remote controller 30, via a wireless LAN router (not illustrated) of the ship network 10, for example.

The orientation sensor 35 detects the pointing direction (oriented direction) of the remote controller 30. The orientation sensor 35 of this embodiment includes a geomagnetism sensor 35a, a gyro sensor 35b, and an acceleration sensor 35c. The geomagnetism sensor 35a is an electronic compass using geomagnetism, and detects, as a terrestrial-reference absolute azimuth, an azimuth at which the tip of the remote controller 30 points (i.e., the pointing direction of the remote controller 30 in a horizontal plane). The gyro sensor 35b detects a posture of the remote controller 30 (e.g., the pointing direction of the remote controller 30 in a plane perpendicular to the horizontal plane). The acceleration sensor 35c detects a change of the pointing direction of the remote controller 30. By combining the detection results from these sensors, the orientation sensor 35 can detect the pointing direction of the remote controller 30 (in three-dimensions) and the change of the pointing direction. Further, the orientation sensor 35 can detect whether an operation of waving the remote controller 30 is performed by the user, based on the detection results of the gyro sensor 35b and the acceleration sensor 35c, etc.

Note that, the orientation sensor 35 is not limited to be the combination of three sensors described above, and may be one or a combination of two of the three sensors. Therefore, the pointing direction of the remote controller 30 may be detected in two-dimensions (e.g., the pointing direction in the horizontal plane, i.e., the azimuth). Moreover, the configuration of the orientation sensor described in this embodiment is merely an example, and sensor(s) other than those described above may be used. For example, a GPS compass may be used instead of the geomagnetism sensor 35a. Also, the processing of calculating the pointing direction of the remote controller 30 by combining the detection results of the respective sensors may be performed by either one of the remote controller 30 and the display device 20.

The vibration motor 36, upon receiving a predetermined signal from the controller 33, provides a notification to the user by causing vibration. Note that, the timing for the vibration motor 36 to provide the notification is described later.

Next, processing of controlling the radar apparatus 13 and the sonar 14 of the own ship by using the remote controller 30 is described. Sensors configured to detect information in the vicinity of the sensor, such as the radar apparatus 13 and the sonar 14, may comprehensively be referred to as the "sensor devices." Note that, the remote controller 30 of this embodiment does not only control the sensor devices, but also has a function to design a course for the autopilot and a function to display the target object and the like existing in the vicinity. Hereinafter, a system including the remote controller 30, the display device 20, and the sensor devices is referred to as a sensor remote control system 100.

In the sensor remote control system 100, a control signal is generated by the remote controller 30 based on the oriented direction (the pointing direction of the remote controller 30). The control signal is transmitted to the sensor device through the display device 20, and the sensor device is controlled based on the control signal. For example, the remote controller 30 adjusts the contents of the detection performed by the sensor device to be different between one of the direction (detecting direction) and the range (detecting range) determined based on the specified direction and other direction. Specifically, in the one of the determined direction and range, a transmission state of the detection signal may be switched between transmitting and not transmitting or properties (e.g., intensity, frequency, pulse width, etc.) of the detection signal may be changed, to be different from other direction, for example. More specifically, when an existence of a school of fish is visually confirmed, it can be considered to perform a predetermined control on the sonar 14 to transmit an ultrasonic wave only/mainly to the one of the direction and the range, for example. Note that, since the remote controller 30 of this embodiment can detect, not only the oriented direction in the horizontal direction (azimuth), but also the oriented direction in the vertical direction, an elevation/depression angle at which the sonar 14 performs the transmission may be changed by taking the oriented direction in the vertical direction into consideration.

Further, without limiting to the visual confirmation, for example, when a direction in which a location with a high potential in catching fish is obtained based on a location where a desired kind of fish was previously caught and registered, the location of the fish bed, the detection result of the sonar 14, etc., a predetermined control may be performed on the sonar 14 to transmit the ultrasonic wave only to this direction.

Moreover, not only to the sonar 14, but the radar apparatus 13 may similarly be controlled. For example, to acquire an accurate echo shape corresponding to a target object which is visually confirmed, it can be considered to increase the number of times of the electromagnetic wave transmissions (reduce the transmission time interval). Furthermore, in a case where a target object confirmed based on, for example, the AIS information is illustrated unsharply, it can be considered to increase the intensity of the electromagnetic wave to be transmitted to the corresponding direction.

Note that, in the above description, the configuration of adjusting the detection signal is described; however, processing on the received reflection wave may be changed to be different only for a predetermined direction. For example, in a case where the radar apparatus 13 has a TT function (a function to automatically detect a position of an acquired target object and estimate a speed vector of the target object based on echoes acquired previously), a target object located in the pointing direction of the remote controller 30 may be acquired.

As a method of setting the one of the direction and the range in which the transmission state of the detection signal is switched between transmitting and not transmitting or the properties of the detection signal is changed, the sensor remote control system 100 of this embodiment can activate a direction specifying mode in which a predetermined detecting direction is specified and a range specifying mode in which a range of the detecting direction (detecting range) is specified. Note that, without providing the mode of specifying the direction, the sensor devices may be controlled based on a current pointing direction of the remote controller 30, by performing a predetermined operation on the remote controller 30.

First, the method of setting the direction to the sensor devices in the direction specifying mode is described with reference to FIGS. 3 and 4.

First, the user sets one of the sensor devices to be adjusted (adjusting target) and adjusting contents, for example, by selecting menu items from the menu screen of the remote controller 30. The adjusting contents indicate a manner of adjusting the detection signal (specifically, whether to switch the transmission state between transmitting and not transmitting or a manner of changing the properties of the detection signal). Further, the user instructs to activate the direction specifying mode. Then, the display unit 31 of the remote controller 30 displays the heading, the current course designed for the autopilot, the oriented direction (the pointing direction of the remote controller 30), etc. These contents are displayed as reference information for the user to specify the direction into the sensor device.

Figure 3:
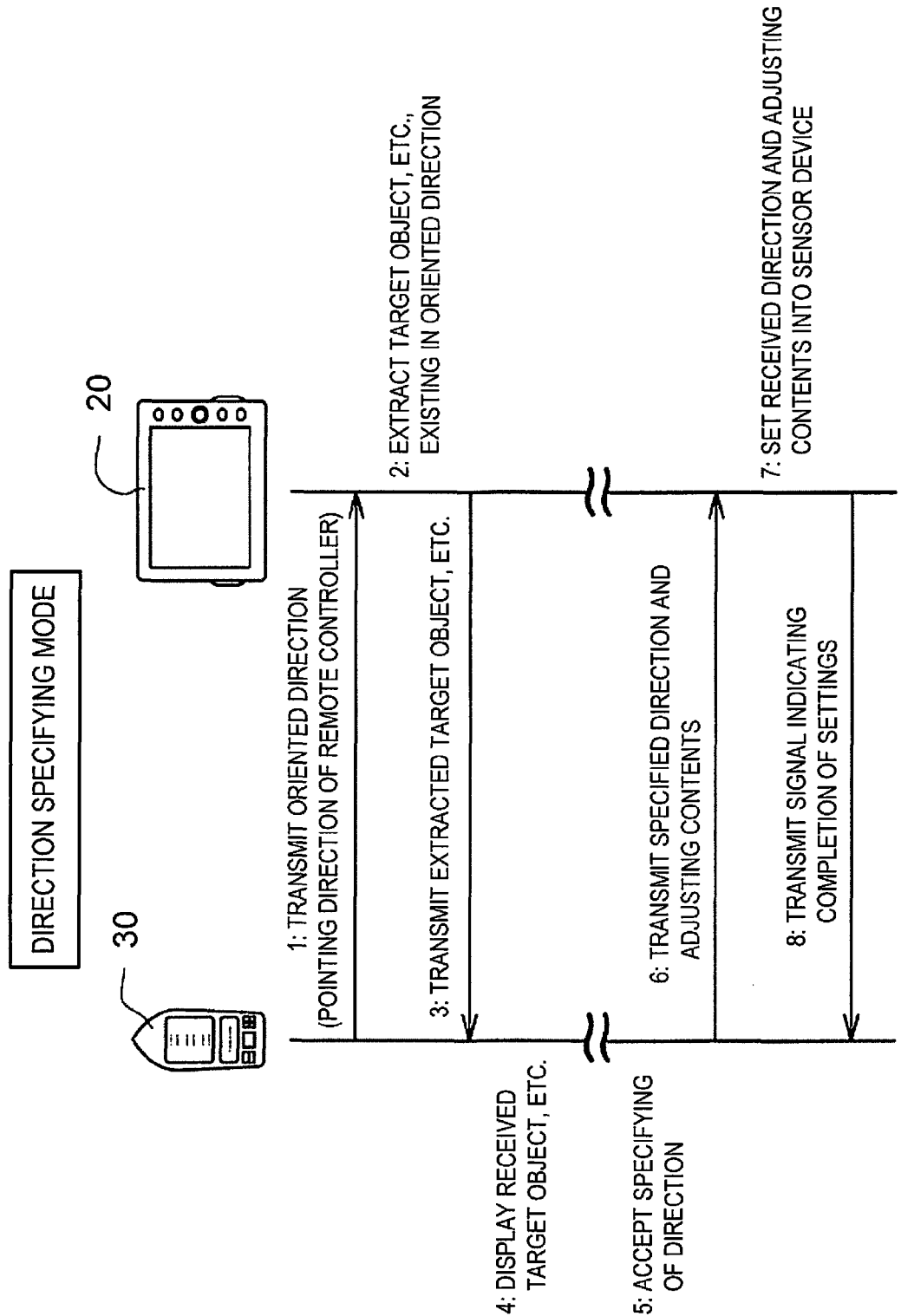
FIG. 3 is a view illustrating a flow of processing performed in a direction specifying mode in which a direction is specified into a sensor device.

Moreover, in the direction specifying mode, the remote controller 30 transmits, to the display device 20, the oriented direction which is the detection result of the orientation sensor 35 (Sequence No. 1 in FIG. 3).

The display device 20, upon receiving the oriented direction, extracts information related to the oriented direction, from the information received from the AIS receiver 12, the radar apparatus 13, and the sonar 14, and the information stored in the memory 23 (Sequence No. 2). Specifically, the display device 20 selects information associated with one of the oriented direction and a position in the oriented direction. Note that, the information associated with the oriented direction or the like includes information associated with the oriented direction or the like accurately and also information associated with a neighboring area of the oriented direction or the like. Then, the display device 20 further extracts information which is considered to be highly important, from the selected information. The level of importance is determined based on a distance to the own ship from a position from which the information is obtained. If the information indicates the other ship, the level of importance is determined based on whether the information is associated with a position forward of the own ship, and if the information indicates the school of fish, the level of importance is determined based on a scale of the school of fish, a fish body length, etc. The display device 20 transmits to the remote controller 30, regarding the extracted information of the target object and/or the like, information of identification, the distance from the own ship, etc. (Sequence No. 3).

The remote controller 30, upon receiving the information of the target object and/or the like from the display device 20, activates the vibration motor 36 to cause vibration and displays the received information of the target object and/or the like from the display device 20 on the display unit 31 (Sequence No. 4). By causing the vibration, the user can grasp that the target object and/or the like exists in the oriented direction, without looking at the display unit 31. Note that, if the target object and the like to be displayed do not exist, the remote controller 30 displays the heading, the course set for the autopilot, and the oriented direction.

Figure 4:
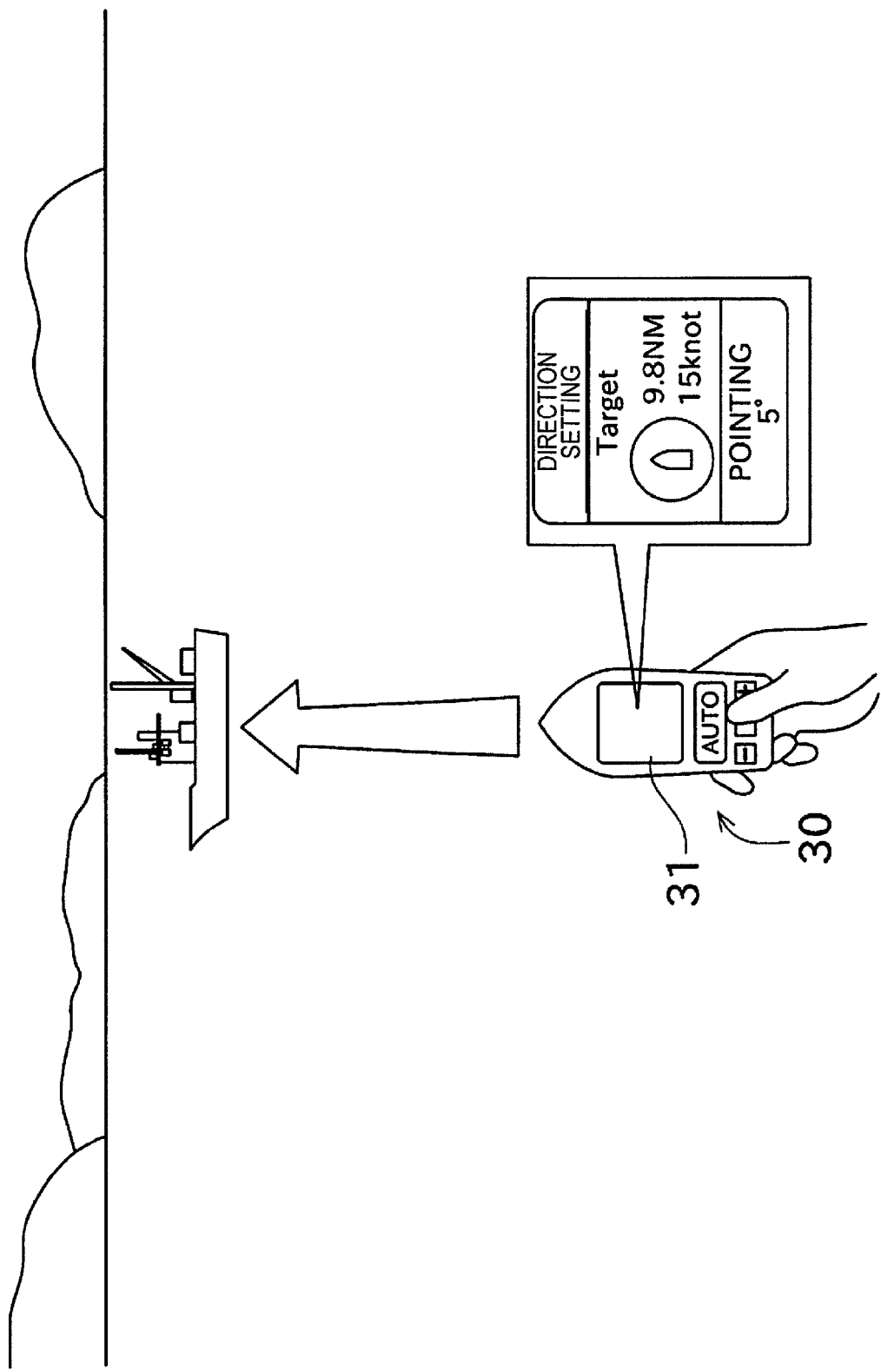
FIG. 4 is a view illustrating a situation where the specifying is performed using the remote controller in the direction specifying mode.

In the example of FIG. 4, in addition to the oriented direction, the target object detected by one of the AIS receiver 12 and the radar apparatus 13 is displayed on the display unit 31. Specifically, a type (e.g., Target) of the information, an icon thereof, a distance thereof from the own ship, and a speed of the target object are displayed. Note that, the remote controller 30 may also display, other than the target object, various information acquired by the display device 20. For example, the remote controller 30 can display information of the school of fish and/or a water bottom acquired from the sonar 14. Further, the remote controller 30 can also display various information included in the nautical chart information, and/or the location specified by the user. Note that, the information regarding the water depth may be the detection result of the sonar 14, or a value included in the nautical chart information.

The user can specify a direction into the sensor device while grasping the vicinity situation, by looking at various information displayed on the remote controller 30. Since the processing illustrated in Sequence No. 1 to 4 is performed as needed, when the target object and/or the like exists in the pointing direction of the remote controller 30, the target object and/or the like is displayed on the display unit 31 in real time.

After Sequence No. 4, the user, by controlling the user-interface 32 while pointing the remote controller 30 in a desired direction, specifies the direction to be transmitted to the sensor device (oriented direction specifying operation). In this embodiment, a case is considered, where the oriented direction specifying operation is performed at an azimuth where the other ship is detected as illustrated in FIG. 4. The remote controller 30 accepts the operation (Sequence No. 5) and transmits a control signal including the information of the specified direction and the adjusting contents set by the user (Sequence No. 6).

The display device 20, upon receiving the control signal including the information of the specified direction and the adjusting contents, sets the information into the set sensor device (in this embodiment, the radar apparatus 13) (Sequence No. 7). Based on the specified direction and the adjusting contents, the sensor device switches the transmission state of the detection signal of the sensor device between transmitting and not transmitting, or changes the properties of the detection signal. For example, upon the oriented direction specifying operation in the situation where the other ship is detected as illustrated in FIG. 4, an increase of the intensity of the electromagnetic wave (detection signal) to be transmitted to the specified direction, an addition of the other ship into the acquired target, etc., are performed. Note that, the radar apparatus 13 and the sonar 14 may perform, to a direction near the specified direction, the same processing performed to the specified direction itself. Then, the display device 20 transmits a signal indicating that the settings for the sensor device are completed (Sequence No. 8).

Figure 5:
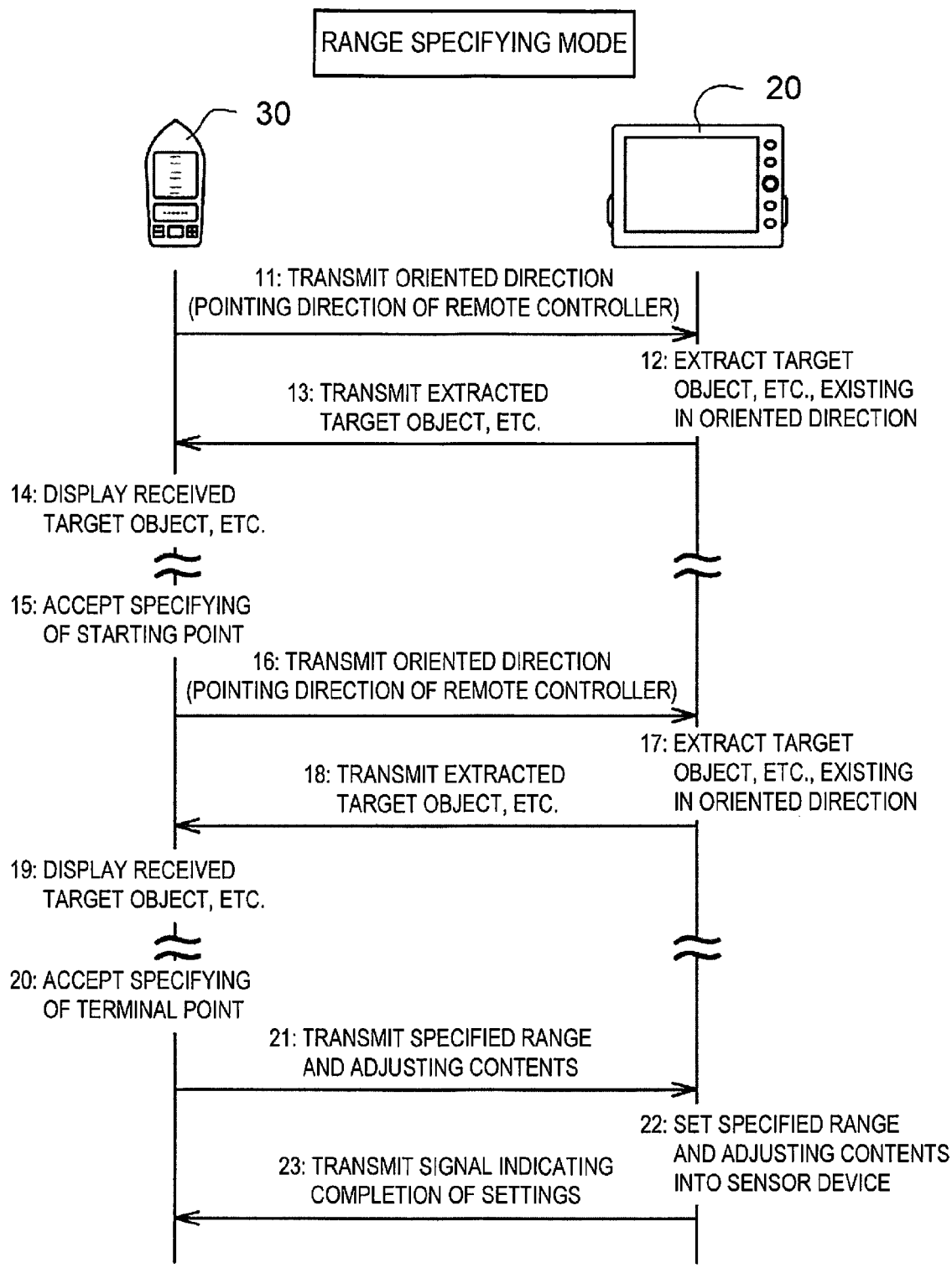
FIG. 5 is a view illustrating a flow of processing performed in a range specifying mode in which a detecting range is specified into the sensor device.

Next, a method of controlling the sensor device in the range specifying mode is described with reference to FIGS. 5 and 6.

First, similar to the direction specifying mode, the user sets the adjusting contents and instructs the activation of the range specifying mode, by performing a predetermined operation on the remote controller 30. In the range specifying mode, a predetermined detecting range is specified by setting a starting direction (starting point) and a terminal direction (terminal point). The remote controller 30 accepts the setting of the starting point before the terminal point (see the remote controller 30 on the left side of FIG. 6). Further, when setting one of the starting point and the terminal point, if the target object and the like to be displayed do not exist, the remote controller 30 displays, on the display device 31, the heading, the current course designed for the autopilot, and the oriented direction, similar to the direction specifying mode.

Then, the sensor remote control system 100 performs processing of displaying the target object and/or the like existing in the oriented direction on the remote controller 30 (Sequence No. 11 to 14). The description of the display processing is omitted since it is similar to that of Sequence No. 1 to 4.

The user, by controlling the user-interface while pointing the remote controller 30 in a desired direction, specifies the starting point of the range (starting point specifying operation). The remote controller 30 accepts this operation and stores the specified starting point (Sequence No. 15). In the example of FIG. 6, as indicated by the remote controller 30, the starting point specifying operation is performed at a timing that the existence of the school of fish is detected. Note that, the user can cancel the specifying of the starting point by performing a predetermined operation. The predetermined operation may be waving the remote controller 30, for example. The operation is, as described above, detectable by the acceleration sensor 35c.

Figure 6:
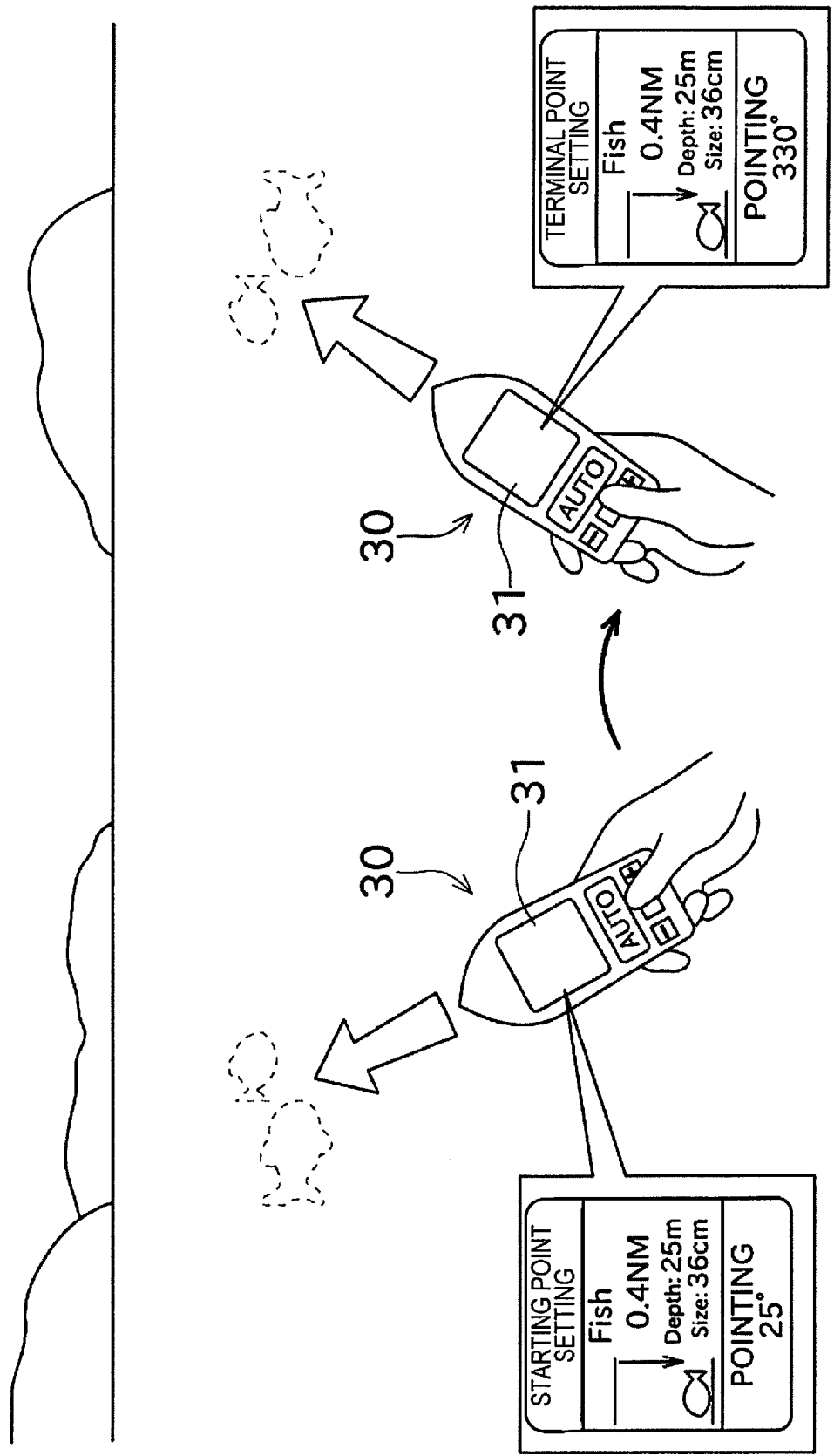
FIG. 6 is a view illustrating a situation where the specifying is performed using the remote controller in the range specifying mode.

Then, the remote controller 30 accepts the setting of the terminal point (see the remote controller 30 on the right side of FIG. 6). Note that, the remote controller 30 performs the processing of displaying the target object and/or the like existing in the orientated direction also while accepting the setting of the terminal point (Sequence No. 16 to 19). The description of the processing is omitted since it is similar to Sequence No. 1 to 4.

Then the user, by controlling the user-interface 32 while pointing the remote controller 30 in a desired direction, specifies the terminal point (terminal point specifying operation). In the example of FIG. 6, the terminal point specifying operation is performed in a direction estimated as an end of the area where the school of fish exists. Thus, the range including the area where the school of fish exists can accurately be specified. The remote controller 30 accepts the specifying of the terminal point (Sequence No. 20). The remote controller 30 transmits, to the display device 20, a control signal including information of the specified starting and terminal points (i.e., specified range) and the adjusting contents (Sequence No. 21).

The display device 20, upon receiving the information of the specified range and the adjusting contents, sets the information into the set sensor device (in this embodiment, the sonar 14) (Sequence No. 22). Next, based on the specified range and the adjusting contents, the sensor device switches the transmission state of the detection signal between transmitting and not transmitting, or changes the properties thereof. For example, by specifying the range where the school of fish exists as illustrated in FIG. 6, the processing of transmitting an ultrasonic wave (detection signal) mainly to the specified range, etc., can be performed. Then the display device 20 transmits a signal indicating that the settings into the sensor device are completed (Sequence No. 23).

As described above, the sensor remote control system 100 of this embodiment includes the remote controller 30 and the sensor devices. Each sensor device transmits and receives the detection signal to acquire the information regarding the direction in which the detection signal is transmitted. The remote controller 30 is transmittable, to the sensor device, of the control signal to remotely control the sensor device, and includes the orientation sensor 35 and the controller communication unit 34. The orientation sensor 35 detects the oriented direction of the remote controller 30. The controller communication unit 34 generates the control signal based on the oriented direction detected by the orientation sensor 35, and transmits the generated control signal to the sensor device. The sensor device performs the detection based on the control signal received from the remote controller 30.

Thus, simply by pointing at a desired direction with the remote controller 30, the direction can be transmitted to the sensor device. Therefore, the direction can be instinctively specified based on information that is confirmed visually.

Although the preferred embodiment of this disclosure is described above, the above configuration may be modified as follows.

In the above embodiment, the remote controller 30 outputs the oriented direction and the like to the sensor device via the display device 20; however, the remote controller 30 may directly output the oriented direction and the like to the sensor device.

The shape of the remote controller 30 is arbitrary, and it may have a stick shape or a rectangular flat plate shape. Further, the remote controller 30 may be connected with any one of the display device 20 and the sensor devices by wire. In this case, the remote controller 30 can communicate with the any one of the display device 20 and the sensor devices without connecting the remote controller 30 to a local area network.

The display unit 31 may be omitted from the remote controller 30 and the notification may be performed by sound, light, etc. Moreover, the remote controller 30 may be configured as a touch screen without including any physical key.

In the above embodiment, the remote controller 30 transmits the oriented direction to the display device 20 and receives the information regarding the oriented direction. Alternatively, the remote controller 30 may store the nautical chart information, etc., and extract information regarding the oriented direction therefrom.

The above-described ship instruments connected to the ship network 10 are merely an example, and may suitably be changed. For example, a fish finder (sensor device) configured to transmit ultrasonic waves directly below the own ship may be connected to the ship network 10.

In the above embodiment, the radar apparatus 13 and the sonar 14 are exemplarily used as the sensor devices; however, other sensor devices may be used.

In the above embodiment, the example in which the sensor remote control system 100 is applied to a ship is described; however, the sensor remote control system 100 is applicable to other movable bodies, such as aircrafts and automobiles. For example, since aircrafts are generally provided with a radar apparatus, the sensor remote control system 100 can be applied similarly to the above embodiment. Moreover, the sensor remote control system 100 is also applicable to other than movable bodies. For example, in a meteorological radar, a transmission range of electromagnetic waves and an orientation of a telescope can be adjusted by using the sensor remote control system 100.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A sensor remote control system, comprising:
a sensor device configured to transmit and receive a detection signal in a direction to detect information; and
a remote control device configured to transmit, to the sensor device, a control signal to remotely control the sensor device,
wherein the remote control device includes:
an orientation sensor configured to detect an oriented direction of the remote control device; and
a communicator configured to generate the control signal based on the oriented direction detected by the orientation sensor, and transmit the control signal to the sensor device, and
wherein the sensor device detects information based on the control signal received from the remote control device.

2. The sensor remote control system of claim 1, wherein the control signal specifies a detecting direction of the sensor device.

3. The sensor remote control system of claim 2, wherein the control signal includes contents of the detection to be different between the detecting direction specified by the remote control device and other direction.

4. The sensor remote control system of claim 1, wherein the control signal specifies a detecting range at least based on a starting point specifying operation in which a starting point of the detecting range is specified and a terminal point specifying operation in which a terminal point of the detecting range is specified.

5. The sensor remote control system of claim 4, wherein the control signal includes contents of the detection to be different between the detecting range specified by the remote control device and other range.

6. The sensor remote control system of claim 1, wherein the remote control device and the sensor device are provided on a ship.

7. The sensor remote control system of claim 1, wherein the remote control device and the sensor device are connected to the same local area network as each other.

8. The sensor remote control system of claim 1, wherein the remote control device is connected to a local area network wirelessly.

9. A remote control device, comprising:
an orientation sensor configured to detect an oriented direction of the remote control device; and
a communicator configured to remotely control a sensor device by generating a control signal based on the oriented direction detected by the orientation sensor and transmitting the control signal to the sensor device, the sensor device transmitting and receiving a detection signal in a direction to detect information in the direction.

10. The remote control device of claim 9, wherein the control signal specifies a detecting direction of the sensor device.

11. The remote control device of claim 10, wherein the control signal includes contents of the detection to be different between the detecting direction specified by the remote control device and other direction.

12. The remote control device of claim 9, wherein the control signal specifies a detecting range at least based on a starting point specifying operation in which a starting point of the detecting range is specified and a terminal point specifying operation in which a terminal point of the detecting range is specified.

13. The remote control device of claim 12, wherein the control signal includes contents of the detection to be different between the detecting range specified by the remote control device and other range.

14. A sensor device, comprising:
a receiver configured to receive a control signal from a remote control device; and
a controller configured to transmit and receive a detection signal in a predetermined direction based on the received control signal to detect information in the predetermined direction, wherein, the control signal generated based on an oriented direction of the remote control device.

15. The sensor device of claim 14, wherein the control signal specifies a detecting direction of the sensor device.

16. The sensor device of claim 15, wherein the control signal includes contents of the detection to be different between the detecting direction specified by the remote control device and other direction.

17. The sensor device of claim 14, wherein the control signal specifies a detecting range at least based on a starting point specifying operation in which a starting point of the detecting range is specified and a terminal point specifying operation in which a terminal point of the detecting range is specified.

18. The sensor device of claim 17, wherein the control signal includes contents of the detection to be different between the detecting range specified by the remote control device and other range.

19. A method of remotely controlling a sensor, comprising:
detecting an oriented direction of a remote control device;
controlling a sensor device by generating a control signal based on the detected oriented direction and transmitting the control signal from the remote control device to the sensor device, the sensor device transmitting and receiving a detection signal in a direction to detect information in the direction;
receiving the transmitted control signal with the sensor device; and
controlling the sensor device based on the transmitted control signal.

20. The method of remotely controlling the sensor of claim 19, wherein the control signal specifies a detecting direction of the sensor device.

* * * * *